(12) United States Patent
Moriya et al.

(10) Patent No.: US 7,746,598 B2
(45) Date of Patent: Jun. 29, 2010

(54) INFORMATION RECORDING MEDIUM AND RECORDING/REPRODUCING APPARATUS

(75) Inventors: Makoto Moriya, Tokyo (JP); Katsumichi Tagami, Tokyo (JP)

(73) Assignee: TDK Corporation, Tokyo (JP)

( * ) Notice: Subject to any disclaimer, the term of this patent is extended or adjusted under 35 U.S.C. 154(b) by 1233 days.

(21) Appl. No.: 11/225,185

(22) Filed: Sep. 14, 2005

(65) Prior Publication Data

US 2006/0077880 A1    Apr. 13, 2006

(30) Foreign Application Priority Data

Sep. 16, 2004    (JP)    ............... 2004-269163

(51) Int. Cl.
  G11B 5/82    (2006.01)
  G11B 7/24    (2006.01)
  G11B 7/00    (2006.01)
  G11B 23/03   (2006.01)

(52) U.S. Cl. ................. 360/135; 369/275.1; 369/275.4; 369/44.27; 360/133

(58) Field of Classification Search ............. 369/275.1, 369/275.4, 44.27; 360/133, 135
See application file for complete search history.

(56) References Cited

U.S. PATENT DOCUMENTS

| 5,540,966 | A | * | 7/1996 | Hintz ..................... 428/64.1 |
| 5,828,536 | A | * | 10/1998 | Morita .................... 360/135 |
| 5,986,833 | A | * | 11/1999 | Higurashi ................ 360/49 |
| 6,014,296 | A | | 1/2000 | Ichihara et al. |
| 6,088,200 | A | * | 7/2000 | Morita .................... 360/135 |
| 7,403,355 | B2 | * | 7/2008 | Soeno et al. ............. 360/135 |
| 7,477,485 | B2 | * | 1/2009 | Soeno et al. ............. 360/135 |
| 7,554,768 | B2 | * | 6/2009 | Soeno et al. ............. 360/135 |

| 2002/0057509 | A1 | | 5/2002 | Nishida et al. |
| 2004/0175510 | A1 | * | 9/2004 | Hattori et al. ............. 427/454 |
| 2005/0045583 | A1 | | 3/2005 | Fujita et al. |
| 2005/0117253 | A1 | | 6/2005 | Moriya et al. |

(Continued)

FOREIGN PATENT DOCUMENTS

JP    9-97419    4/1997

(Continued)

OTHER PUBLICATIONS

English language Abstract of JP 9-97419.

(Continued)

*Primary Examiner*—Joseph H Feild
*Assistant Examiner*—Nicholas Lee
(74) *Attorney, Agent, or Firm*—Greenblum & Bernstein P.L.C.

(57) ABSTRACT

An information recording medium excellent in surface smoothness. The information recording medium has a data track pattern and a servo pattern formed on at least one surface of a substrate by a concave/convex pattern including a plurality of convex portions. The concave/convex pattern has concave portions each having a non-magnetic material embedded therein. An A concave/convex pattern forming the servo pattern includes a plurality of servo convex portions formed in a manner associated with servo data. At least part of the plurality of servo convex portions are formed by a B concave/convex pattern including a plurality of non-servo convex portions. This arrangement makes it possible to maintain excellent surface smoothness within a servo pattern area, thereby enabling the recording/reproducing apparatus to execute stable recording and reproducing on and from the information recording medium.

10 Claims, 8 Drawing Sheets

U.S. PATENT DOCUMENTS

2005/0219730 A1    10/2005    Sakurai et al.

FOREIGN PATENT DOCUMENTS

| JP | 9-138927 | 5/1997 |
| JP | 2002-150729 | 5/2002 |

OTHER PUBLICATIONS

English language Abstract of JP 2002-150729.

U.S. Appl. No. 11/085,522 to Takai et al., which was filed on Mar. 22, 2005.
U.S. Appl. No. 11/214,813 to Soeno et al., which was filed on Aug. 31, 2005.
U.S. Appl. No. 11/214,827 to Soeno et al., which was filed on Aug. 31, 2005.
U.S. Appl. No. 11/229,650 to Soeno et al., which was filed on Sep. 20, 2005.
English language Abstract of JP 9-138927.

* cited by examiner

INFORMATION RECORDING MEDIUM AND RECORDING/REPRODUCING APPARATUS

BACKGROUND OF THE INVENTION

1. Field of the Invention

The present invention relates to an information recording medium having a data track pattern and a servo pattern formed thereon by a concave/convex pattern and having a non-magnetic material embedded in each concave portion of the concave/convex pattern, and a recording/reproducing apparatus including the information recording medium.

2. Description of the Related Art

As a recording/reproducing apparatus including the information recording medium of the above-mentioned kind, there has been disclosed a magnetic recording apparatus including a discrete track-type magnetic disk, in Japanese Laid-Open Patent Publication (Kokai) No. H09-097419. In this case, the magnetic disk has concentric recording tracks (belt-like convex portion) formed on one side of a glass disk substrate (substrate) by a magnetic recording member (magnetic material). Further, at locations (concave portions) between the recording tracks, there are formed guard band portions each having a guard band member (non-magnetic material) embedded therein, for enhancing the surface smoothness of the magnetic disk and magnetically separating adjacent magnetic tracks from each other. When the magnetic disk is manufactured, first, a magnetic material is sputtered on one side of the substrate to form a magnetic recording layer. Then, a positive-type resist is spin-coated on the magnetic recording layer in a manner covering the same, and is pre-baked, whereafter the same pattern as a pattern formed on the guard band portions is drawn using a master disk-cutting apparatus, and the drawn pattern is subjected to a development treatment. Thus, a resist pattern is formed on the magnetic recording layer. Subsequently, after the magnetic recording layer is etched using the resist pattern as a mask, the remaining mask is eliminated by an ashing apparatus, whereby recording tracks and a servo pattern (convex portions) made of the magnetic material are formed on the substrate. Then, a non-magnetic material is sputtered on the substrate in the above state. In doing this, the non-magnetic material is sufficiently sputtered until concave portions between the recording tracks are completely filled with the non-magnetic material, and at the same time the recording tracks are covered with the non-magnetic material. After that, the surface of the sputtered non-magnetic material is subjected to a dry etching process, whereby the upper surfaces of the recording tracks are caused to be exposed from the non-magnetic material. As a result, the recording tracks and the guard band portions are caused to be adjacent to each other, whereby the magnetic disk is completed.

SUMMARY OF THE INVENTION

From the study of the above-described conventional magnetic disk, the present inventors found out the following problems to be solved: In the conventional magnetic disk, after sputtering the non-magnetic material in a manner covering the magnetic recording layer (recording tracks), the non-magnetic material is subjected to the dry etching process until the upper surfaces of convex portions of the recording tracks, the servo pattern, and the like, are exposed, whereby the surfaces of the non-magnetic material are smoothed into a flat surface. However, when the magnetic disk is manufactured by the above manufacturing method, the thickness of the non-magnetic material remaining after execution of the dry etching process on the convex portions relatively large in length in the direction of rotation of the magnetic disk and in the radial direction (hereinafter, the non-magnetic material remaining on the convex portions is also referred to as "residue") sometimes becomes too large.

Figure 14:
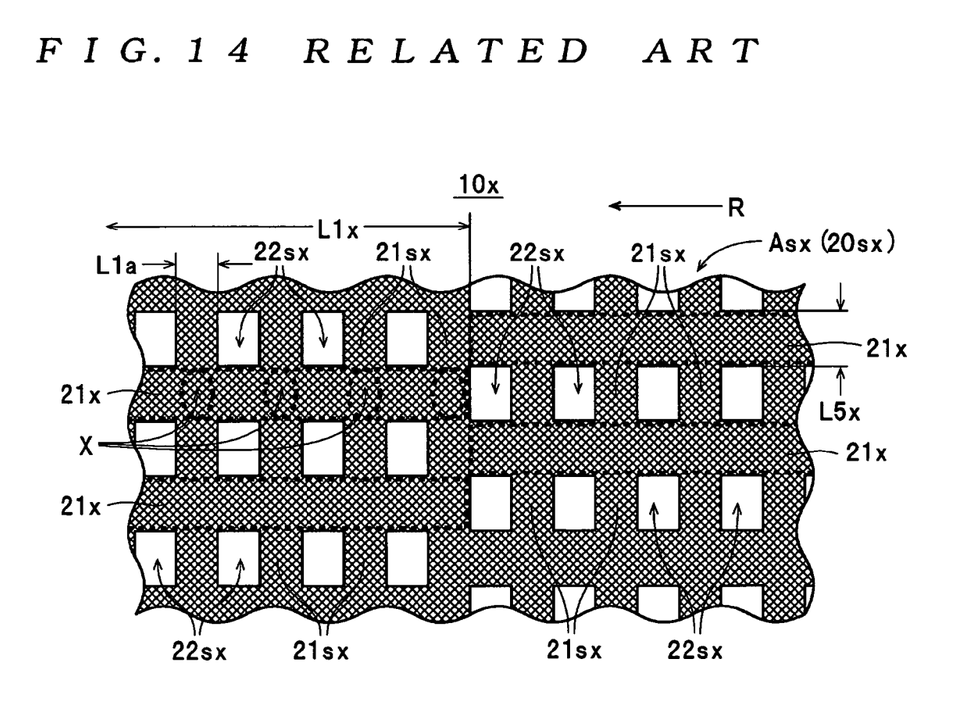
FIG. 14 is a plan view of a servo pattern area (burst pattern) of a conventional magnetic disk.
Figure 15:
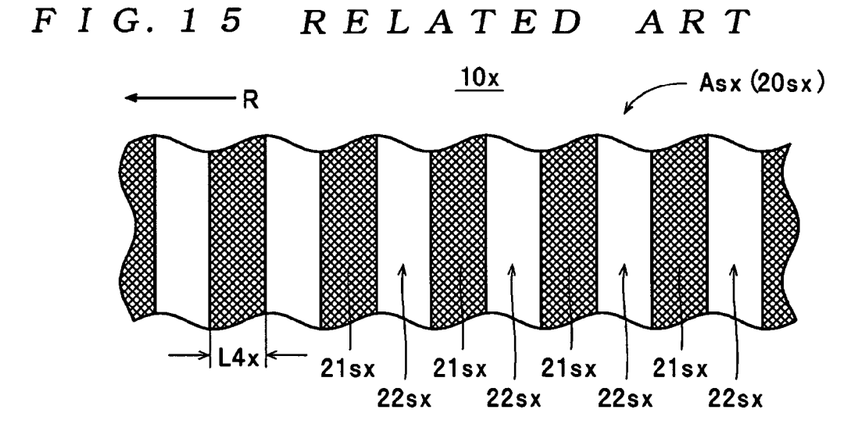
FIG. 15 is a plan view of a servo pattern area (preamble pattern) of the conventional magnetic disk.

For example, as shown in FIGS. 14 and 15, the magnetic disk 10x manufactured by the above manufacturing method is configured such that track pattern areas (not shown) each formed with a concave/convex pattern for a track pattern, and servo pattern areas Asx each formed with a concave/convex pattern 20sx for tracking servo are alternately arranged side by side in the direction of rotation of the magnetic disk 10x (direction indicated by arrows R in FIGS. 14 and 15). It should be noted that FIG. 14 conceptually shows a portion formed with a concave/convex pattern forming a burst pattern of the concave/convex pattern 20sx, and FIG. 15 conceptually shows a portion formed with a concave/convex pattern forming a preamble pattern of the concave/convex pattern 20sx. In this case, as shown in FIG. 14, an area forming the burst pattern of the concave/convex pattern 20sx, for example, is comprised of portions formed with convex portions 21sx and concave portions 22sx, which are alternately arranged side by side in the direction of rotation of the magnetic disk 10x, and portions (portions each formed as a single convex portion long in the direction of rotation and handled as a non-signal portion) formed with a convex portion 21x (portion indicated by broken lines in FIG. 14) which forms the burst pattern together with the convex portions 21sx and the concave portions 22sx.

Figure 16:
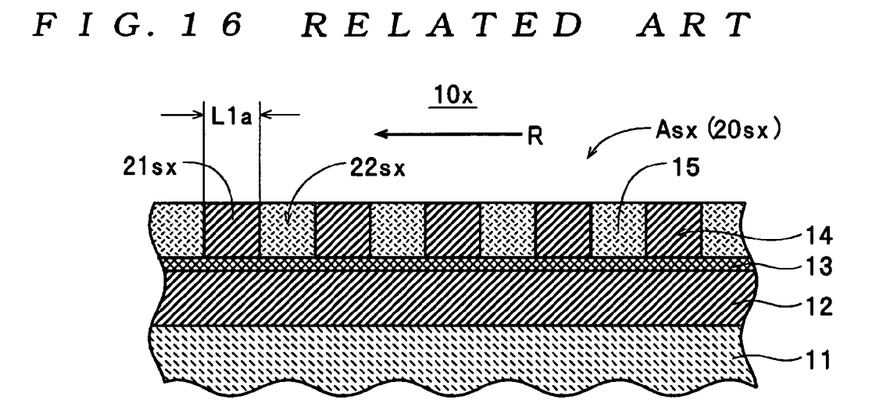
FIG. 16 is a cross-sectional view of portions of the FIG. 15 servo pattern area where convex portions and concave portions are formed.
Figure 17:
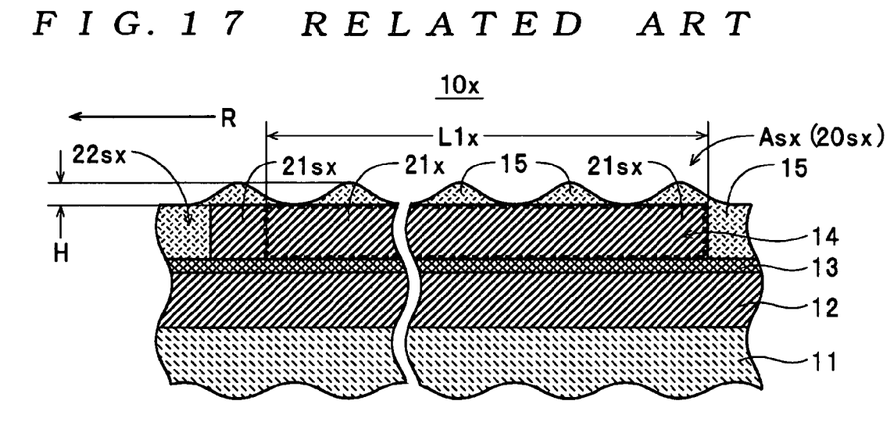
FIG. 17 is a cross-sectional view of portions of the FIG. 15 servo pattern area where other convex portions are formed.

On the other hand, the present assignee found out a phenomenon that when a non-magnetic layer is smoothed e.g. by dry etching, as a convex portion existing thereunder has a larger length (the upper surface of the convex portion has a larger width), the etching process on the non-magnetic layer on the convex portion becomes slow in progress. Therefore, as shown in FIG. 16, when the whole servo pattern area Asx is etched under an etching condition for eliminating the non-magnetic layer on the convex portions 21sx having a relatively short length L1a (or for causing a residue on the convex portions 21sx to have a proper thickness) (etching condition for obtaining excellent surface smoothness of portions formed with the convex portion 21sx and the concave portion 22sx), a thick residue (non-magnetic layer) remains on the convex portion 21x having a relatively large length L1x, as shown in FIG. 17. In this case, on the convex portions 21x, the progress of the etching process becomes slower on portions (portions indicated by arrows X, each surrounded by an elliptical shape in broken line in FIG. 14) where the convex portions 21sx exist adjacent thereto in the radial direction of the magnetic disk 10x (the vertical direction, as viewed in FIG. 14) than on portions where the concave portions 22sx exist adjacent thereto in the radial direction. As a result, on the portions indicated by X, part of the non-magnetic material is left unremoved as a residue. This causes a remarkable increase in the height difference H between the surface of the non-magnetic layer on the convex portions 21x and the surface of the non-magnetic layer in the concave portions 22sx, which degrades the surface smoothness of the magnetic disk 10x in the portions formed with the convex portions 21x. As described above, the conventional magnetic disk 10x suffers from the problem that the surface smoothness within the servo pattern areas Asx of the magnetic disk 10x is degraded due to an increase in thickness of portions (the residue) of the non-magnetic layer e.g. on the convex portion 21x having a relatively large length.

The present invention has been made in view of these problems, and a main object thereof is to provide an information recording medium excellent in surface smoothness, and a recording/reproducing apparatus including the information recording medium excellent in surface smoothness.

To attain the above object, in a first aspect of the invention, there is provided an information recording medium wherein a data track pattern and a servo pattern are formed at least on one side of a substrate by concave/convex patterns including a plurality of convex portions, the concave/convex patterns having concave portions each having a non-magnetic material embedded therein, and wherein an A concave/convex pattern forming the servo pattern comprises a plurality of servo convex portions formed in a manner associated with servo data, at least part of the plurality of servo convex portions being formed by a B concave/convex pattern having a plurality of non-servo convex portions.

According to this information recording medium, the servo convex portions are formed by the B concave/convex pattern including the plurality of non-servo convex portions, whereby it is possible to form the servo convex portions using non-servo convex portions having at least one of a length thereof in the direction of rotation of the substrate and a length thereof in the radial direction of the substrate shorter than a corresponding length of a conventional servo convex portion. Therefore, it is possible to avoid a thick residue from being left on the non-servo convex portions when an etching process is carried out on a non-magnetic material formed in a manner covering the concave/convex pattern forming the servo pattern. Since this makes it possible to avoid a thick residue from being produced e.g. on portions of a conventional magnetic disk where convex portions are formed, it is possible to maintain excellent surface smoothness of a servo pattern area. This makes it possible to maintain a proper flying height of the magnetic head within the servo pattern area, and consequently, according to a recording/reproducing apparatus having the information recording medium mounted thereon, it is possible to execute stable recording and reproducing of recording data on and from the information recording medium.

Further, it is possible to form the B concave/convex pattern such that a pitch at which the non-servo convex portions are formed in a direction of rotation of the substrate is different from a pitch at which the servo convex portions are formed in the direction of rotation of the substrate. This arrangement makes it possible to differentiate the frequency of a signal corresponding to the A concave/convex pattern (the cycle at which the servo convex portions pass under the magnetic head), and the frequency of a signal corresponding to the B concave/convex pattern (the cycle at which the non-servo convex portions pass under the magnetic head), when servo data is read from the information recording medium. Therefore, according to the recording/reproducing apparatus having the information recording medium mounted thereon, it is possible to extract a signal component corresponding to the A concave/convex pattern from a signal obtained via the magnetic head by eliminating or attenuating a signal component of the signal corresponding to the B concave/convex pattern. This makes it possible to obtain servo data without being adversely affected by the presence of the B concave/convex pattern to execute servo control.

It should be noted that throughout the specification, the term "pitch at which the servo convex portions are formed" is intended to mean "total length of the convex portion unit length of the servo convex portion and the concave portion unit length of the servo concave portion formed between the servo convex portions". In this case, the term "convex portion unit length" is intended to mean a reference length for detecting that "there exists one convex portion" when a magnetic signal is read from the information recording medium, and the term "concave portion unit length" is intended to mean a reference length for detecting that "there exists one concave portion" when a magnetic signal is read from the information recording medium. Therefore, in the actual information recording medium, servo convex portions each having the length of an integral multiple of the convex portion unit length, or the length of an integral multiple of the total length (pitch at which the servo convex portions are formed) of the convex portion unit length and the concave portion unit length, and servo concave portions each having the length of an integral multiple of the concave portion unit length, or the length of an integral multiple of the total length (pitch at which the servo convex portions are formed) of the convex portion unit length and the concave portion unit length are formed depending on the contents of servo data, whereby the servo pattern is formed. In this case, the reference length for detecting that "there exists one convex portion" can be set as a length common to the whole servo pattern, or as lengths different on a pattern-by-pattern basis depending on the kind of the pattern (preamble pattern, address pattern, burst pattern, and the like) forming the servo pattern. Similarly, the reference length for detecting that "there exists one concave portion" can be set as a length common to the whole servo pattern, or as lengths different on a pattern-by-pattern basis depending on the kind of the servo pattern. Further, in general, a portion of the information recording medium where a servo convex portion is formed is detected as "presence of the output of a detection signal" or "a detection signal at high signal level", and a portion of the information recording medium where a servo concave portion is formed is detected as "absence of the output of a detection signal" or "a detection signal at low signal level". However, a convex portion, such as a convex portion of the conventional magnetic disk, is dealt with as a no-signal portion. Further, throughout the specification, the term "non-servo convex portion" is intended to mean a convex portion formed without being associated with servo data (convex portion formed by a formation pattern having no influence on the contents of servo data). In short, in the present specification, the B concave/convex pattern forms a flat surface-forming concave/convex pattern having no servo function but the function of forming the surfaces into a flat surface.

Furthermore, it is possible to form the B concave/convex pattern such that the pitch at which the non-servo convex portions are formed in the direction of rotation of the substrate is smaller than the pitch at which the servo convex portions are formed in the direction of rotation of the substrate. This arrangement makes it possible to make the length of each non-servo convex portion in the direction of rotation of the substrate sufficiently shorter than the length of each servo convex portion in the direction of rotation of the substrate. Therefore, it is possible to avoid a thick residue from being left on the non-servo convex portions when the etching process is performed on the non-magnetic material formed in a manner covering the concave/convex pattern forming the servo pattern. This makes it possible to maintain more excellent surface smoothness within the servo pattern area in the information recording medium. Further, since the frequency of a signal component corresponding to the B concave/convex pattern is higher than the frequency of a signal component corresponding to the A concave/convex pattern, it is possible to eliminate or attenuate the signal component corresponding to the B concave/convex pattern, using a general noise filter mounted on a recording/reproducing apparatus of the above-mentioned kind.

Further, it is possible to form the non-servo convex portion such that at least one of a length thereof in the direction of rotation of the substrate and a length thereof in a radial direction of the substrate is equal to or smaller than a corresponding length of the servo convex portion. This arrangement makes it possible to avoid a thick residue from being left on the non-servo convex portions when the etching process is performed on the non-magnetic material. This makes it possible to maintain excellent surface smoothness within the servo pattern area in the information recording medium.

To attain the above object, according to a second aspect of the present invention, there is provided a recording/reproducing apparatus comprising an information recording medium wherein a data track pattern and a servo pattern are formed at least on one side of a substrate by concave/convex patterns including a plurality of convex portions, the concave/convex patterns having concave portions each having a non-magnetic material embedded therein, and wherein an A concave/convex pattern forming the servo pattern comprises a plurality of servo convex portions formed in a manner associated with servo data, at least part of the plurality of servo convex portions being formed by a B concave/convex pattern having a plurality of non-servo convex portions, a magnetic head for obtaining a signal recorded on the information recording medium, a signal-extracting section for extracting a signal component corresponding to the A concave/convex pattern while eliminating or attenuating a signal component corresponding to the B concave/convex pattern from the signal obtained by the magnetic head, and a control section for performing servo control according to servo data based on the signal component extracted by the signal-extracting section.

According to this recording/reproducing apparatus, the signal-extracting section extracts a signal component corresponding to the A concave/convex pattern by eliminating or attenuating a signal component corresponding to the B concave/convex pattern from the signal obtained by the magnetic head, and the control section performs servo control based on the signal component extracted by the signal-extracting section. This makes it possible to read out servo data from the servo pattern area without being adversely affected by the plurality of non-servo convex portions formed for the purpose of obtaining excellent surface smoothness, to thereby perform accurate tracking servo.

It should be noted that the present disclosure relates to the subject matter included in Japanese Patent Application No. 2004-269163 filed Sep. 16, 2004, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Hereafter, an information recording medium and a recording/reproducing apparatus, according to a preferred embodiment of the present invention, will be described with reference to the accompanying drawings.

Figure 1:
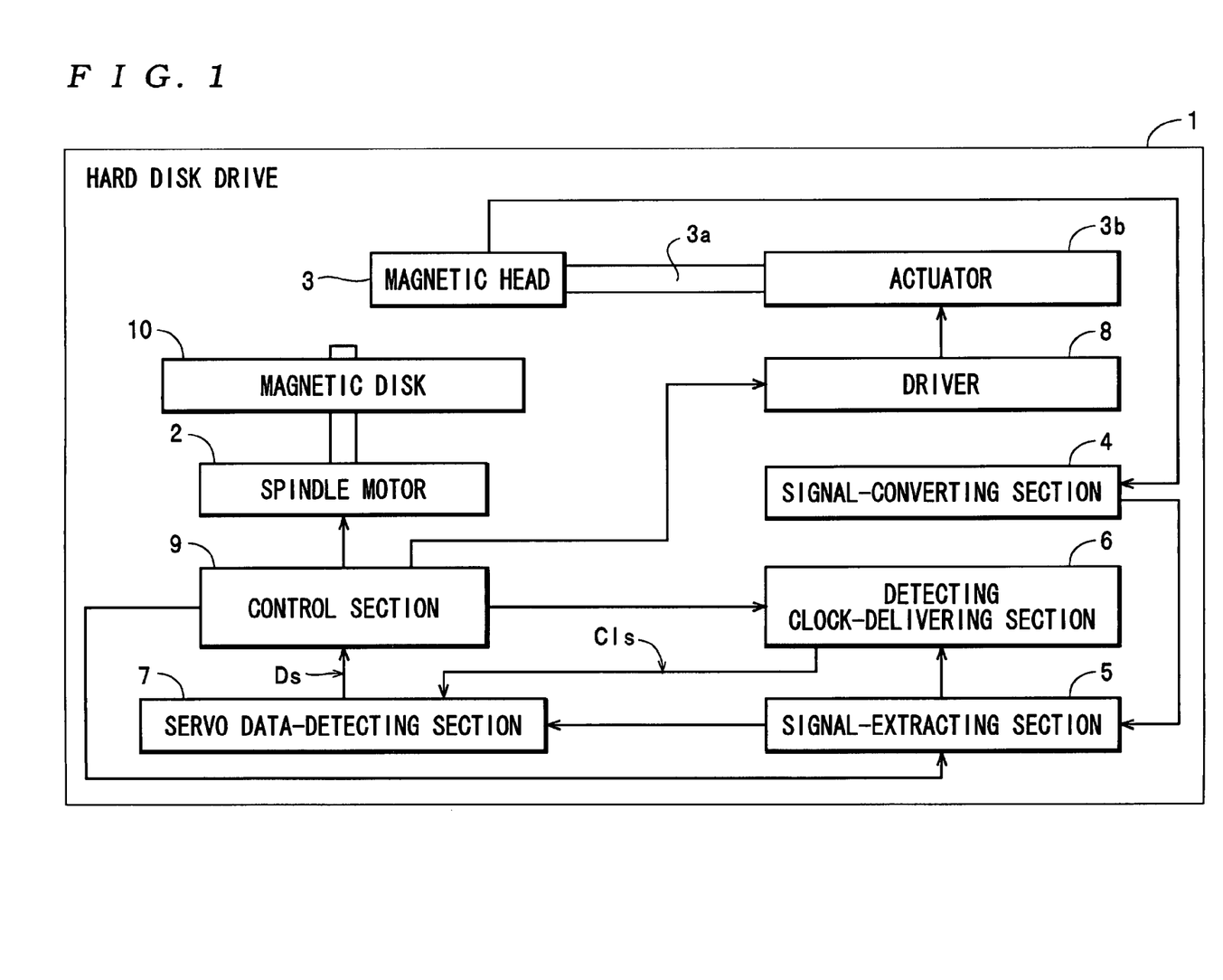
FIG. 1 is a block diagram of the arrangement of a hard disk drive.
Figure 2:
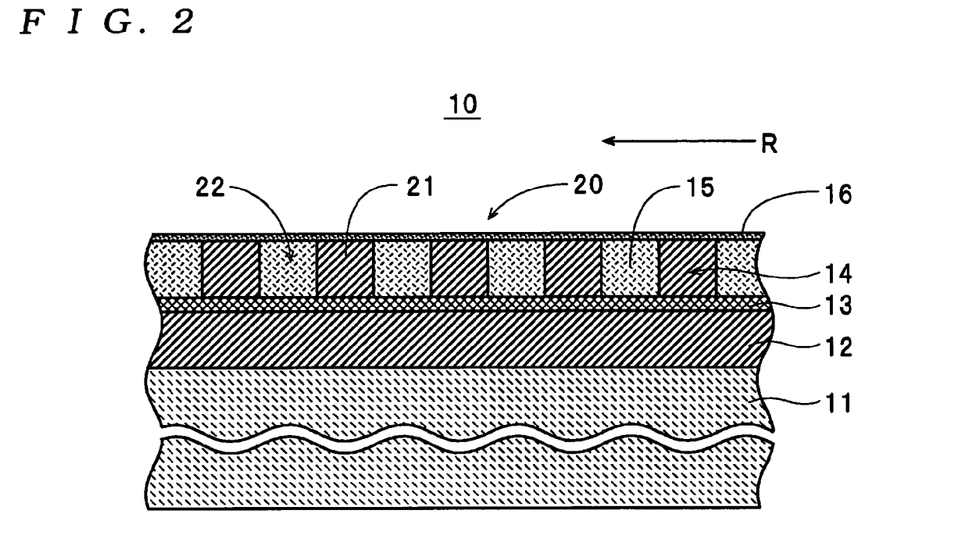
FIG. 2 is a cross-sectional view of the layer structure of a magnetic disk.

Referring first to FIG. 1, a hard disk drive 1 is a magnetic recording/reproducing apparatus as an example of a recording/reproducing apparatus according to the present invention, and is comprised of a spindle motor 2, a magnetic head 3, a signal-converting section 4, a signal-extracting section 5, a detecting clock-delivering section 6, a servo data-detecting section 7, a driver 8, a control section 9, and a magnetic disk 10. In this case, the magnetic disk 10 is a discrete track-type magnetic disk (patterned medium) capable of recording data in a perpendicular recording method, and corresponds to an information recording medium according to the present invention. More specifically, as shown in FIG. 2, the magnetic disk 10 has a soft magnetic layer 12, an intermediate layer 13, and a magnetic layer 14 sequentially formed on a glass substrate 11 in the mentioned order. In this case, the magnetic layer 14 formed on the intermediate layer 13 has a predetermined concave/convex pattern 20 formed by alternately forming convex portions 21, and concave portions 22, made of a magnetic material. Further, the concave portions 22 have a non-magnetic material 15, such as $SiO_2$, embedded therein. Furthermore, a thin film of diamond-like carbon (DLC) is formed e.g. by a chemical vapor deposition (CVD) method on the convex portions 21 and the non-magnetic material 15 embedded in the concave portions 22 to thereby form a protective layer (DLC film) 16 having a thickness of approximately 2 nm. Further, the magnetic disk 10 has lubricant (Fomblin lubricant, for example) applied to the surface of the protective layer 16 thereof.

The glass substrate 11 corresponds to a substrate in the present invention, and is formed to have a thickness of approximately 0.6 mm by polishing the surface of a glass plate having a diameter of 2.5 inches such that the glass plate has a surface roughness Ra of approximately 0.2 to 0.3 nm. It should be noted that the material of the substrate in the present invention is not limited to glass, but the substrate can be made e.g. any of suitable non-magnetic materials, such as aluminum and ceramics. The soft magnetic layer 12 is formed to have a thickness of approximately 100 to 200 nm by sputtering a soft magnetic material, such as a Co—Zr—Nb alloy. The intermediate layer 13 serves as a base layer for forming the magnetic layer 14 thereon, and is formed to have a thickness of approximately 40 nm by sputtering an intermediate layer-forming material, such as Cr or a Co—Cr non-magnetic alloy. The magnetic layer 14 is comprised of the convex portions 21 (concave/convex pattern 20) which are made of a magnetic material and are formed e.g. by sequentially performing a process for sputtering a Co—Cr—Pt alloy, and a process for forming the concave portions 22 by etching using a resist pattern or the like as a mask, in the mentioned order, as described hereinafter.

Figure 3:
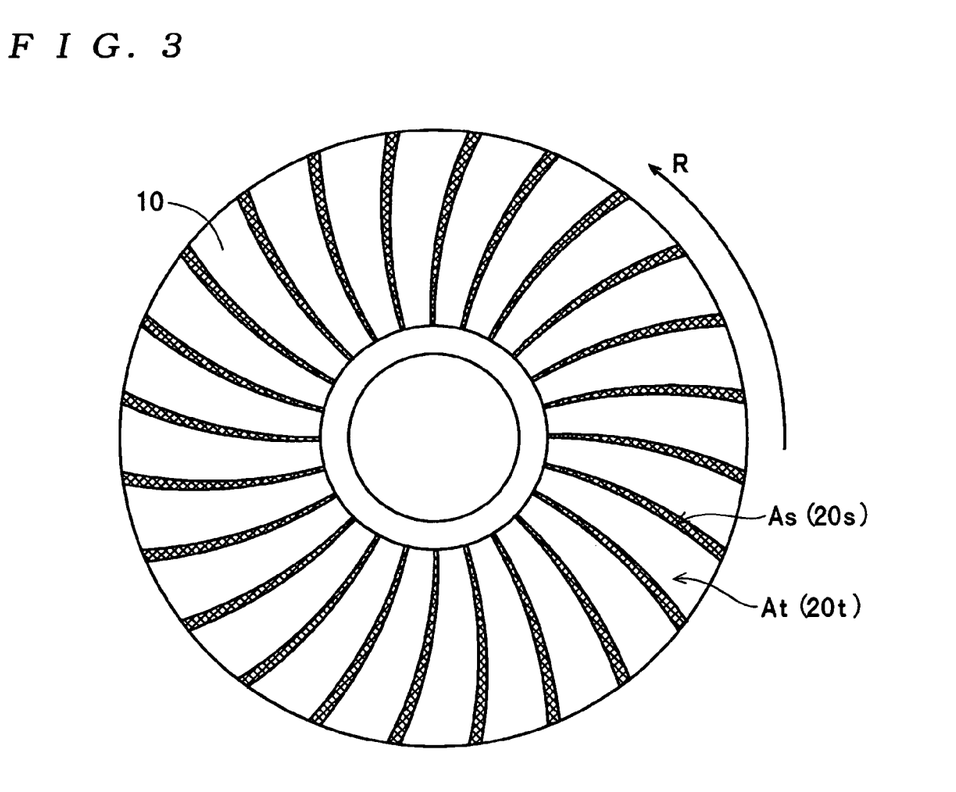
FIG. 3 is a plan view of the magnetic disk.
Figure 4:
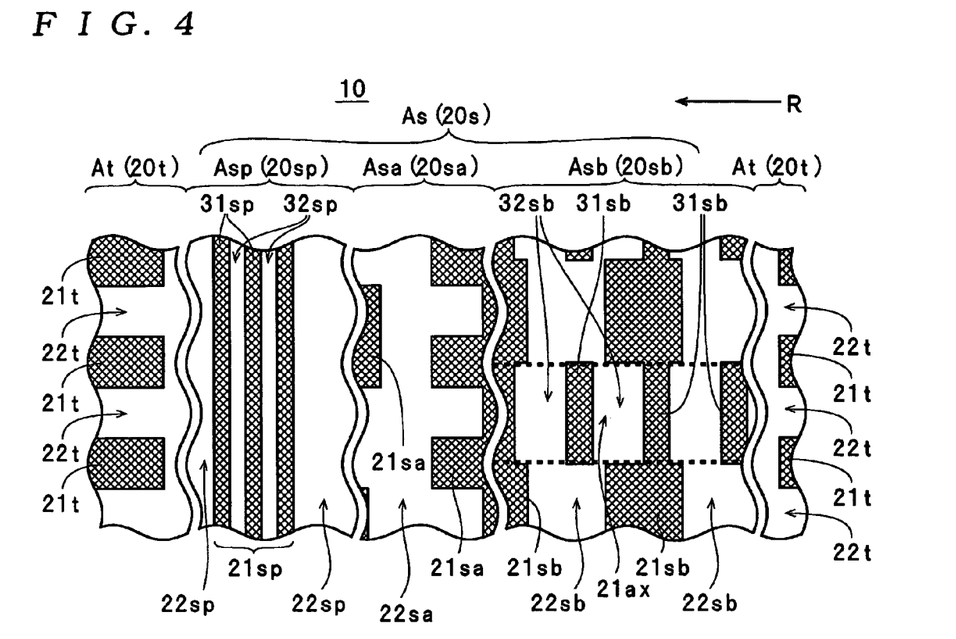
FIG. 4 is a plan view of a track pattern area and a servo pattern area.

In this case, as shown in FIG. 3, in the magnetic disk 10, servo pattern areas As are formed between track pattern areas At to set the track pattern areas At and the servo pattern areas As such that they are alternately arranged side by side in the direction of rotation of the magnetic disk 10 (direction indicated by an arrow R in FIG. 3). Further, as shown in FIG. 4, each track pattern area At is formed with a concave/convex pattern 20$t$ as a data track pattern. In this case, the concave/convex pattern 20$t$ is comprised of a large number of concentric convex portions 21$t$ (data recording tracks: hereinafter also referred to as "the recording tracks") having their center at a rotation center of the magnetic disk 10, and concave portions 22$t$ between the concentric convex portions 21$t$. It should be noted that a manufacturing error can cause a very small displacement of approximately 30 to 50 μm between the rotation center of the magnetic disk 10 and the center of the concave/convex pattern 20$t$. However, even with the amount of displacement to this extent, it is possible to sufficiently perform the tracking servo control of the magnetic head 3, and hence it can be considered that the rotation center of the magnetic disk 10 and the center of the concave/convex pattern 20$t$ are substantially the same. Further, the non-magnetic material 15 is embedded in the concave portions 22$t$ of the concave/convex pattern 20$t$, and the surfaces of track pattern areas At are smoothed into a flat surface.

Figure 8:
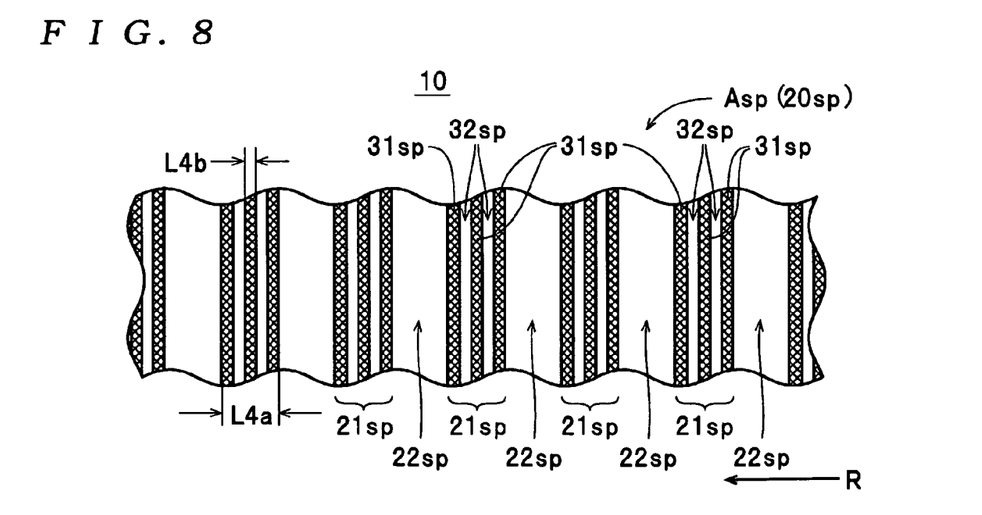
FIG. 8 is a plan view of a preamble pattern area in the servo pattern area.

Referring to FIG. 4, each servo pattern area As is comprised of a preamble pattern area Asp, an address pattern area Asa, and a burst pattern area Asb. In this case, in the magnetic disk 10, as described hereinafter, the preamble pattern area Asp and the burst pattern area Asb are formed with servo convex portions formed by a B concave/convex pattern according to the present invention. The preamble pattern area Asp is formed with a concave/convex pattern 20$sp$, which is an example of an A concave/convex pattern according to the present invention. In this case, as shown in FIG. 8, the concave/convex pattern 20$sp$ is formed by alternately arranging a plurality of convex portions 21$sp$, which are an example of the servo convex portions in the present invention, and function similarly to convex portions 21$sx$, shown in FIG. 15, for a preamble pattern in a conventional magnetic disk 10$x$, and a plurality of concave portions 22$sp$ formed between the convex portions 21$sp$, in the direction of rotation of the magnetic disk 10 (direction indicated by an arrow R in FIG. 8). Further, the convex portions 21$sp$ are formed by a concave/convex pattern (B concave/convex pattern: a concave/convex pattern for use in forming flat surfaces) having convex portions 31$sp$ which are an example of non-servo convex portions in the present invention, and concave portions 32$sp$ (example of a state in which the servo convex portions are formed by the B concave/convex pattern having non-servo convex portions formed thereon at a pitch which is different from and at the same time smaller than a pitch at which servo convex portions are formed).

In this case, the length L4$a$ of each convex portion 21$sp$ in the direction of rotation of the magnetic disk 10 is set to be equal to the length L4$x$ (see FIG. 15) of the corresponding convex portion 21$sx$ for the preamble pattern in the conventional magnetic disk 10$x$ in the direction of rotation of the magnetic disk 10$x$. Further, the length L4$b$ of each convex portion 31$sp$ in the direction of rotation of the magnetic disk 10 is sufficiently shorter than the length L4$a$ of the convex portion 21$sp$ in the direction of rotation of the magnetic disk 10. It should be noted that although in FIG. 8, for ease of understanding of the present invention, an example is illustrated in which one convex portion 21$sp$ is formed by three convex portions 31$sp$ and two concave portions 32$sp$, it is possible to form the one convex portion 21$sp$ by a larger number of convex portions 31$sp$ and a larger number of concave portions 32$sp$.

Figure 5:
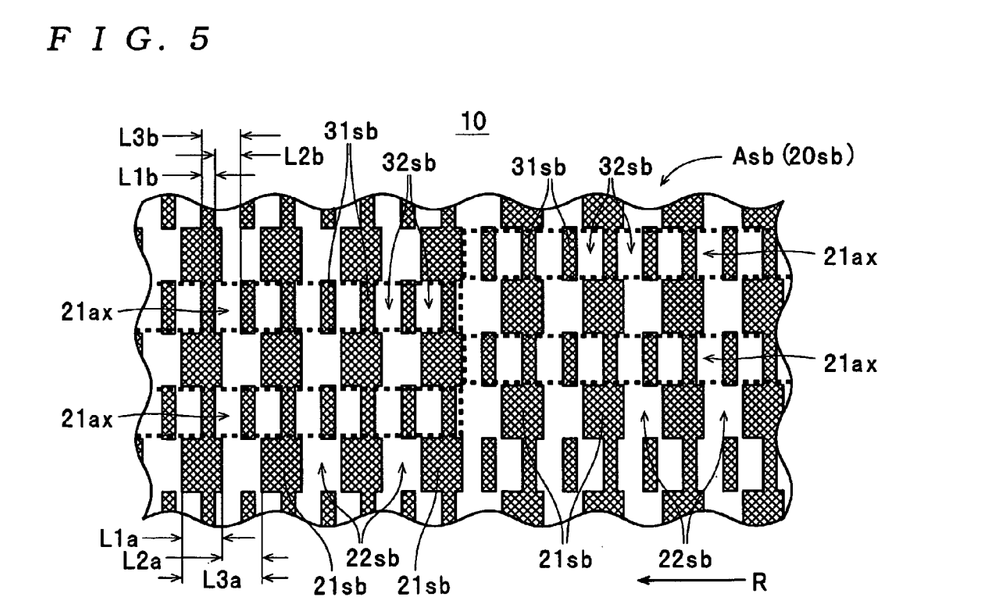
FIG. 5 is a plan view of a burst pattern area in the servo patter area.

As shown in FIG. 4, the address pattern area Asa is formed with a concave/convex pattern 20$sa$ having a plurality of convex portions 21$sa$ and a plurality of concave portions 22$sa$. The burst pattern area Asb is formed with a concave/convex pattern 20$sb$, which is an example of the A concave/convex pattern in the present invention. More specifically, as shown in FIG. 5, the concave/convex pattern 20$sb$ is comprised of portions formed by alternately arranging convex portions 21$sb$ (example of the servo convex portions in the present invention) and concave portions 22$sb$ in the direction of rotation of the magnetic disk 10 (direction indicated by an arrow R in FIG. 5), and portions formed with a plurality of convex portions 21$ax$ (portions surrounded by broken lines in FIGS. 4 and 5) which are an example of the servo convex portions in the present invention, and function similarly to the convex portions 21$x$, shown in FIG. 14, for the burst pattern in the conventional magnetic disk 10$x$. Further, in the magnetic disk 10, the B concave/convex pattern in the present invention is formed by a concave/convex pattern formed by alternately arranging the convex portions 31$sb$ which are an example of the non-servo convex portions in the present invention, and the concave portions 32$sb$ side by side in the direction of rotation of the magnetic disk 10, and one convex portion 21$ax$ is formed by the B concave/convex pattern.

In this case, the length L1$b$ of each convex portion 31$sb$ in the direction of rotation is set to be shorter than the length L1$a$ of the convex portion 21$sb$ in the direction of rotation (equal to one third of the length L1$a$ in the illustrated example). Similarly, the length L2$b$ of each concave portion 32$sb$ in the direction of rotation is set to be shorter than the length L2$a$ of the concave portion 22$sb$ in the direction of rotation (equal to two thirds of the length L2$a$ in the illustrated example). Further, in the magnetic disk 10, the length L1$a$ of the convex portion 21$sb$ in the direction of rotation and the length L2$a$ of the concave portion 22$sb$ in the direction of rotation are set to be equal to each other, by way of example. Therefore, a length L3$b$, which is the total length of the length L1$b$ of the convex portion 31$sb$ and the length L2$b$ of the concave portion 32$sb$ (i.e. a pitch at which the convex portions 31$sb$ are formed), is set to be sufficiently shorter than a length L3$a$ (equal to one half thereof in the illustrated example), which is the total length of the length L1$a$ of the convex portion 21$sb$ and the length L2$a$ of the concave portion 22$sb$ (i.e. a pitch at which the convex portions 21$sb$ are formed) (example of "a state in which non-servo convex portions are formed at a pitch different from the pitch at which the servo convex portions are formed", and an example of "a state in which non-servo convex portions are formed at a pitch smaller than the pitch at which the servo convex portions are formed").

It should be noted that in the figures referred to in the present specification, the preamble pattern, the address pattern, and the burst pattern of the servo pattern are schematically shown, and for ease of understanding of the present invention, the respective lengths of the convex portions 21s (convex portions 21sp, 21sa, and 21sb) in the direction of rotation, and the respective lengths of the concave portions 22s (concave portions 22sp, 22sa, and 22sb) in the direction of rotation are shown only by the convex portion unit length and the concave portion unit length of the servo pattern. Therefore, in an actual magnetic disk 10, the numbers, the respective forming locations and the lengths of the convex portions 21s and those of the concave portions 22s are different from the states shown in the respective figures, but are set in a manner associated with various control data including information (patterns) of track addresses, sector addresses, etc., necessary for the tracking servo control, whereby the concave/convex patterns 20s are formed. In this case, the actual lengths of the convex portion 21s and the concave portion 22s are equal to respective lengths of integral multiples of the length of the convex portion 21s and the length of the concave portion 22s (the convex portion unit length and the concave portion unit length). It should be noted that the convex portion 21ax as well is an example of the servo convex portion in the present invention, and the length of the convex portion 21ax in the direction of rotation is not necessarily equal to a length having an integral multiple of the convex portion unit length, differently from the above-described convex portion 21s. In this case, the length of the convex portion 21ax in the direction of rotation is equal to an integral multiple of the total length (i.e. the pitch at which the servo convex portions are formed) of the convex portion unit length and the concave portion unit length. Further, the information recording medium of this kind is rotated by the recording/reproducing apparatus during recording and reproducing of recording data on condition that the angular speed is constant, so that the distance over which the information recording medium is caused to pass under the magnetic head per unit time is longer in an outer diameter area of the information recording medium than in an inner diameter area thereof. Accordingly, in the magnetic disk 10, the length of each convex portion 21s (the convex portion unit length), the length of each concave portion 22s (the concave portion unit length), and the length of each portion 21ax are set such that they are increased e.g. in proportion to the distance between the location of each portion and the center of the magnetic disk 10 (the center of the concave/convex pattern 20t) as the location varies toward the outer periphery of the disk.

On the other hand, the spindle motor 2 rotates the magnetic disk 10 e.g. at a constant rotational speed of 4200 rpm under the control of the control section 9. As shown in FIG. 1, the magnetic head 3 is mounted on an actuator 3b via a swing arm 3a, and moved over the magnetic disk 10 when recording data is recorded on or reproduced from the magnetic disk 10. Further, the magnetic head 3 reads out servo data from servo pattern areas As of the magnetic disk 10, magnetically writes recording data in track pattern areas At (convex portions 21t), and reads out recording data magnetically written in the track pattern areas At. It should be noted that actually, the magnetic head 3 is formed on a bottom surface (air bearing surface) of a slider for flying the magnetic head 3 with respect to the magnetic disk 10, but detailed description of the slider and illustration thereof in figures are omitted. The actuator 3b causes the swing arm 3a to swing under the control of the control section 9 by drive current supplied from the driver 8, thereby moving the magnetic head 3 to an arbitrary recording/reproducing position over the magnetic disk 10. The signal-converting section 4 includes an amplifier, an LPF (Low Pass Filter), an A/D converter, none of which are shown, amplifies various signals obtained from the magnetic disk 10 by the magnetic head 3, eliminates noises therefrom, carries out A/D conversion thereon, and then delivers the resulting signals.

The signal-extracting section 5 is implemented e.g. by a DSP (Digital Signal Processor), and extracts a signal component corresponding to the A concave/convex pattern while eliminating or attenuating a signal component corresponding to the B concave/convex pattern, from a signal delivered from the signal-converting section 4, e.g. by DFT (Discrete Fourier Transform), and outputs the extracted signal component to the detecting clock-delivering section 6 and the servo data-detecting section 7. It should be noted that it is possible to cause the LPF disposed in the above-described signal-converting section 4 to serve as the signal-extracting section 5 by setting a pitch at which is formed the B concave/convex pattern, as a sufficiently small value. The detecting clock-delivering section 6 obtains (detects) preamble data (signal corresponding to a preamble pattern as a pattern in which the convex portions 21sp and the concave portions 22sp are formed) read out from the preamble pattern area Asp via the magnetic head 3, from the signal extracted by the signal-extracting section 5. Further, the detecting clock-delivering section 6 generates (detects) a detecting clock Cls used as a reference clock when the servo data is detected, based on the obtained data, and delivers the detecting clock Cls to the servo data-detecting section 7. The servo data-detecting section 7 obtains (detects) servo data Ds from the signal extracted by the signal-extracting section 5 by reading the extracted signal in synchronism with the detecting clock Cls delivered from the detecting clock-delivering section 6, and outputs the servo data Ds to the control section 9. The driver 8 controls the actuator 3b according to a control signal delivered from the control section 9 to place the magnetic head 3 over a desired recording track (convex portion 21t). The control section 9 performs overall control of the hard disk drive 1. Further, the control section 9 controls the driver 8 based on the servo data Ds output from the servo data-detecting section 7.

Next, a description will be given of a method of manufacturing the magnetic disk 10, and a method of using the hard disk drive 1 having the magnetic disk 10 mounted thereon.

First, the soft magnetic layer 12 is formed by sputtering the Co—Zr—Nb alloy on the glass substrate 11, and then the intermediate layer 13 is formed by sputtering the intermediate layer-forming material on the soft magnetic layer 12. After that, the magnetic layer 14 having a thickness of approximately 15 nm is formed by sputtering the Co—Cr—Pt alloy on the intermediate layer 13. Thus, the intermediate for manufacturing the magnetic disk 10 is completed. Subsequently, a C (carbon) mask layer having a thickness of approximately 12 nm is formed e.g. by the sputtering method, and a Si mask layer having a thickness of approximately 4 nm is formed on the C mask layer by the sputtering method, and then a mask-forming functional layer having a thickness of approximately 130 nm is formed by spin-coating a positive-type electron beam resist on the Si mask layer. After that, an exposure pattern having the same shape in plan view as that of the concave/convex pattern 20s and that of the concave/convex pattern 20t is drawn on the mask-forming functional layer by irradiating an electron beam onto the mask-forming functional layer with an electron beam drawing apparatus. Then, the mask-forming functional layer having the exposure pattern drawn thereon is subjected to a development treatment, whereby a resist pattern (concave/convex pattern) is formed on the Si mask layer.

Subsequently, an ion beam etching process with an argon (Ar) gas is carried out using the above-described resist pattern as a mask to thereby form a concave/convex pattern (Si mask pattern) on the Si mask layer. Then, a reactive ion etching process with an oxygen gas as a reactant gas is performed using the Si mask pattern as a mask, whereby a concave/convex pattern (C mask pattern) is formed on the C mask layer. Thereafter, the ion beam etching process with an argon (Ar) gas is carried out using the above-described C mask pattern as a mask. As a result, portions of the magnetic layer 14 covered with the mask pattern are formed into the convex portions 21, and portions thereof exposed from the mask pattern are formed into the concave portions 22, whereby the concave/convex pattern 20 (concave/convex patterns 20s and 20t) is formed on the intermediate layer 13. Then, a reactive ion etching process with an oxygen gas as a reactant gas is performed on the C mask layer (C mask pattern) remaining on the convex portions 21, whereby the upper surfaces of the convex portions 21, are caused to be exposed (the remaining C mask layer is eliminated).

Subsequently, $SiO_2$ as the non-magnetic material 15 is sputtered by setting the pressure of an argon (Ar) gas e.g. to 0.3 Pa while applying bias power e.g. of approximately 150 W to the intermediate. In doing this, the non-magnetic material 15 is sufficiently sputtered such that the concave portions 22 are completely filled with the non-magnetic material 15, and at the same time a layer of the non-magnetic material 15 having a thickness e.g. of approximately 60 nm is formed on the upper surface of each of the convex portions 21. In this case, the non-magnetic material 15 is sputtered in a state in which bias power is applied to the intermediate, whereby a layer of the non-magnetic material 15 is formed such that it has no large asperities on a surface thereof. After that, the layer of the non-magnetic material 15 on the magnetic layer 14 (on the convex portions 21, on the concave portions 22, and inside the concave portions 22) is subjected to the ion beam etching process, in a state in which the pressure of the argon (Ar) gas is set e.g. to 0.04 Pa, and the incidence angle of an ion beam to the surface of the intermediate is set to 2 degrees. In doing this, the ion beam etching process continues to be performed until the respective upper surfaces of the convex portions 21s (convex portions 21sp, 21sa, and 21sb) of the intermediate are caused to be exposed from the non-magnetic material 15.

Figure 6:
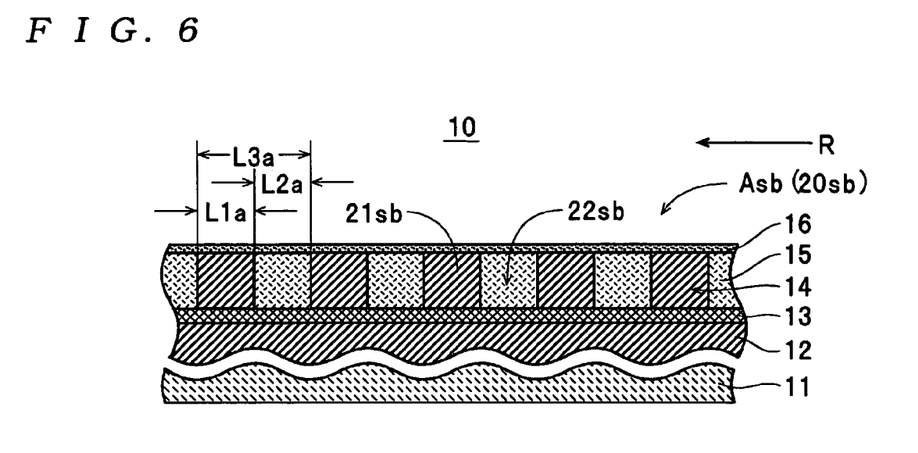
FIG. 6 is a cross-sectional view of portions of the burst pattern area where convex portions and concave portions are formed.
Figure 7:
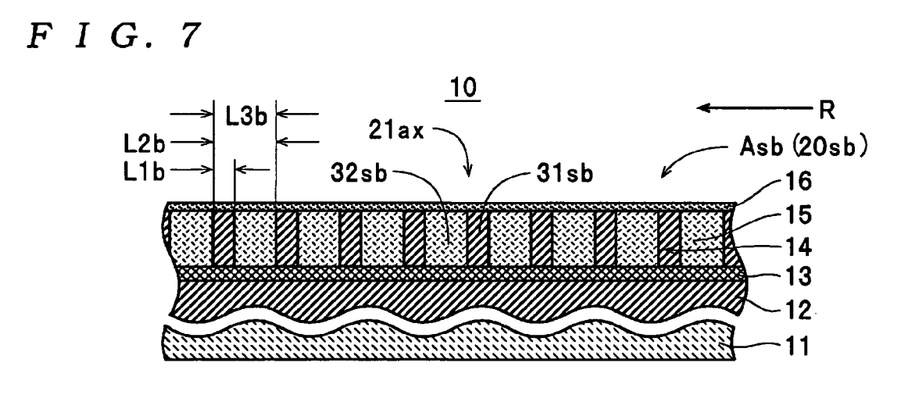
FIG. 7 is a cross-sectional view of portions of the burst pattern area where other convex portions and concave portions are formed.

In this case, as shown in FIG. 5, in the magnetic disk 10 (intermediate), a concave/convex pattern (B concave/convex pattern) comprised of the convex portions 31sb and the concave portions 32sb is formed e.g. at portions of the burst pattern area Asb where the convex portions 21x of the conventional magnetic disk 10x are formed, at a pitch smaller than the pitch at which are formed the convex portions 21sb forming the burst pattern, and by this B concave/convex pattern, the convex portions 21ax functioning similarly to the conventional convex portions 21x are formed. Accordingly, as shown in FIG. 6, the ion beam etching process continues to be performed until the upper surfaces of the convex portions 21sb are caused to be exposed from the non-magnetic material 15, whereby as shown in FIG. 7, the non-magnetic material 15 on the convex portions 31sb shorter than the convex portions 21sb in length in the direction of rotation is also eliminated, whereby the upper surfaces of the convex portions 31sb are caused to be exposed. This results in the exposure of all the upper surfaces of the convex portions 21ax. It should be noted that FIGS. 6 and 7 show the magnetic disk 10 in a state in which formation of the protective layer 16 has been completed. Therefore, the protective layer 16 shown in these figures does not exist when the ion beam etching process has been completed. Thus, the ion beam etching process on the layers of the non-magnetic material 15 has been completed to flatten the surface of the intermediate. Subsequently, a thin film of diamond-like carbon (DLC) is formed by the CVD method in a manner covering the surface of the intermediate, whereby the protective layer 16 is formed, whereafter the Fomblin lubricant is applied to the surface of the protective layer 16 such that the average thickness of the applied lubricant is e.g. approximately 2 nm. Thus, as shown in FIG. 2, the magnetic disk 10 is completed. After that, the completed magnetic disk 10 is mounted on the spindle motor 2, whereby the hard disk drive 1 is manufactured.

As shown in FIG. 5, in the above magnetic disk 10, the convex portions 21ax are formed by forming a plurality of convex portions 31sb (B concave/convex pattern) at portions of the conventional magnetic disk 10x where the convex portions 21x having a length of L1x are formed, at a pitch different from the pitch at which the convex portions 21sb are formed in a manner associated with the servo information (burst pattern) (at a pitch equal to one half of the pitch at which the convex portions 21sb, are formed in the illustrated example). Therefore, the long convex portions 21 (convex portions 21 with large upper surfaces) which can delay the progress of etching of the non-magnetic material 15 do not exist in the burst pattern area Asb, and hence the rate of etching of the non-magnetic material 15 during the manufacturing of the magnetic disk 10 becomes approximately equal in the whole burst pattern area Asb.

In this case, even if an attempt is made to form the convex portions 31sb (B concave/convex pattern) at a pitch smaller than one tenth of the pitch at which the convex portions 21sb are formed, it is difficult to form a fine pattern e.g. due to pattern falling (undesired contact of adjacent patterns) during formation of a mask, which can cause a lack of the convex portions 31sb. Further, when the convex portions 31sb (B concave/convex pattern) are formed at a pitch equal to the pitch at which the convex portions 21sb are formed, it is difficult to eliminate or attenuate a signal component corresponding to the convex portions 31sb (B concave/convex pattern). Therefore, it is preferable to form the convex portions 31sb at a pitch within a range between equal to or larger than one tenth of a pitch at which the convex portions 21sb are formed and smaller than the pitch.

Further, since the convex portions 31sb are formed at the pitch smaller than the pitch at which the convex portions 21sb are formed, the length L1b of each convex portion 31sb is sufficiently shorter than the length L1a of each convex portion 21sb, and the length L2b of each concave portion 32sb is sufficiently shorter than the length L2a of each concave portion 22sb. Therefore, when the whole burst pattern area Asb is etched under an etching condition which can eliminate the residue of the non-magnetic material 15 on the convex portions 21sb, it is possible to avoid a thick residue from being left on the convex portions 31sb. Furthermore, as shown in FIG. 8, in the magnetic disk 10, the convex portions 21sp constituting the preamble pattern is formed by a concave/convex pattern comprised of the plurality of convex portions 31sp, and the plurality of concave portions 32sp. In this case, since the length L4b of each convex portion 31sp is sufficiently shorter than the length L4a of each convex portion 21sp, it is possible to avoid a thick residue from being left on the convex portions 31sp when the non-magnetic material 15 is subjected to the etching process.

On the other hand, when recording data is recorded or reproduced by the hard disk drive 1, the control section 9 controls the spindle motor 2 to rotate the magnetic disk 10 at a constant rotational speed e.g. of 4200 rpm. Then, the driver 8 controls the actuator 3b under the control of the control section 9 to move the magnetic head 3 to a position over the magnetic disk 10. In doing this, a signal obtained by the magnetic head 3 from a servo pattern area As is delivered to the signal-extracting section 5 after A/D conversion by the signal-converting section 4. Further, the signal-extracting section 5 extracts a signal component corresponding to the A concave/convex pattern (e.g., a concave/convex pattern comprised of the convex portions 21sp and the concave portions 22sp in the preamble pattern area Asp, or a concave/convex pattern comprised of the convex portions 21sb and the concave portions 22sb in the burst pattern area Asb) while eliminating or attenuating a signal component corresponding to the B concave/convex pattern (e.g., a concave/convex pattern comprised of the convex portions 31sp and the concave portions 32sp in the preamble pattern area Asp, or a concave/convex pattern comprised of the convex portions 31sb and the concave portions 32sb in the burst pattern area Asb), from a signal delivered from the signal-converting section 4, and outputs the extracted signal component to the detecting clock-delivering section 6 and the servo data-detecting section 7.

In doing this, the detecting clock-delivering section 6 generates a detecting clock Cls used as a reference clock, based on a signal corresponding to the concave/convex pattern (preamble pattern) comprised of the convex portions 21sp and the concave portions 22sp, out of a signal extracted by the signal-extracting section 5, and delivers the detecting clock Cls to the servo data-detecting section 7. On the other hand, the servo data-detecting section 7 obtains servo data Ds from the signal extracted by the signal-extracting section 5 by reading the extracted signal in synchronism with the detecting clock Cls delivered from the detecting clock-delivering section 6, and outputs the servo data Ds to the control section 9. Further, the control section 9 controls the driver 8 according to the servo data Ds output from the servo data-detecting section 7, to thereby place the magnetic head 3 over a desired recording track. After that, recording of recording data on recording tracks (convex portions 21t) under the control of the control section 9, or reading out (reproducing) of recording data from recording tracks is performed.

As described hereinabove, according to the magnetic disk 10 and the hard disk drive 1, the convex portions 21sp (servo convex portions) within the preamble pattern area Asp are formed by the concave/convex pattern (B concave/convex pattern) having the plurality of convex portions 31sp (non-servo convex portions), and the convex portions 21ax (servo convex portions) within the burst pattern area Asb are formed by the concave/convex pattern (B concave/convex pattern) having the plurality of convex portions 31sb (non-servo convex portions), whereby it is possible to form the servo convex portions (convex portions 21sp and 21ax) using the non-servo convex portions whose length in the direction of rotation of the magnetic disk 10 is shorter than the corresponding length of the servo convex portion of the conventional magnetic disk 10x. Therefore, by performing the etching process on the layers of the non-magnetic material 15, formed in a manner covering the concave/convex pattern 20sp forming the preamble pattern and the concave/convex pattern 20sb forming the burst pattern, under an etching condition which can cause the upper surfaces of the convex portions 21sb and the like to be exposed, it is possible to similarly cause the upper surfaces of the convex portions 31sp and the convex portions 31sb to be exposed. This makes it possible to avoid a thick residue from being produced on portions of the conventional magnetic disk 10x where the convex portions 21x are formed, or on portions of the conventional magnetic disk 10x where the convex portions 21sx for the preamble pattern, having a relatively large length in the direction of rotation of the conventional magnetic disk 10x are formed, so that it is possible to maintain excellent surface smoothness of the preamble pattern area Asp and the burst pattern area Asb (servo pattern area As). This makes it possible to maintain a proper flying height of the magnetic head 3 within the servo pattern area As, and consequently, according to the hard disk drive 1 having the magnetic disk 10 mounted thereon, it is possible to execute stable recording and reproducing of recording data on and from the magnetic disk 10.

Further, in the magnetic disk 10 and the hard disk drive 1, the concave/convex pattern 20sp is formed by forming the B concave/convex pattern in the present invention such that the pitch at which the convex portions 31sp are formed in the direction of rotation of the magnetic disk 10 and the pitch at which the convex portions 21sp are formed in the direction of rotation are different from each other, and the concave/convex pattern 20sb is formed by forming the B concave/convex pattern in the present invention such that the pitch at which the convex portions 31sb are formed in the direction of rotation and the pitch at which the convex portions 21sb are formed in the direction of rotation are different from each other. Therefore, according to the magnetic disk 10 and the hard disk drive 1, when servo data is read from the magnetic disk 10, it is possible to differentiate the frequency of a signal corresponding to the concave/convex pattern (A concave/convex pattern) comprised of the convex portions 21sp and the concave portions 22sp (the cycle at which the convex portions 21sp pass under the magnetic head), and the frequency of a signal corresponding to the concave/convex pattern (B concave/convex pattern) comprised of the convex portions 31sp and the concave portions 32sp (the cycle at which the convex portions 31sp pass under the magnetic head), and differentiate the frequency of a signal corresponding to the concave/convex pattern (A concave/convex pattern) comprised of the convex portions 21sb and the concave portions 22sb (the cycle at which the convex portions 21sb pass under the magnetic head), and the frequency of a signal corresponding to the concave/convex pattern (B concave/convex pattern) comprised of the convex portions 31sb and the concave portions 32sb (the cycle at which the convex portions 31sb pass under the magnetic head). Therefore, according to the hard disk drive 1 having the magnetic disk 10 mounted thereon, it is possible to extract a signal component corresponding to the A concave/convex pattern in the present invention by executing elimination or attenuation of a signal component corresponding to the B concave/convex pattern from a signal obtained via the magnetic head 3. This makes it possible to obtain servo data without being adversely affected by the presence of the B concave/convex pattern (the convex portions 31sp and 31sb and the concave portions 32sp and 32sb) to thereby carry out servo control.

Furthermore, according to the magnetic disk 10 and the hard disk drive 1, the B concave/convex pattern is formed by forming the convex portions 31sp at a pitch smaller than the pitch at which the convex portions 21sp are formed, and at the same time the B concave/convex pattern is formed by forming the convex portions 31sb at a pitch smaller than the pitch at which the convex portions 21sb are formed the convex portions 21sb (example in which the non-servo convex portions are formed such that the length thereof in the direction of rotation of the substrate is equal to or smaller than the corresponding length of the servo convex portion), whereby it is possible to make the length L4b of each convex portion 31sp sufficiently shorter than the length L4a of each convex portion 21sp, and the length L1b of the convex portion 31sb sufficiently shorter than the length L1a of each convex portion 21sb. Accordingly, when the whole burst pattern area Asb is etched e.g. under an etching condition which can eliminate the residue of the non-magnetic material 15 on the convex portions 21sb, it is possible to positively avoid a thick residue from being left on the convex portions 31sb, so that it is possible to maintain more excellent surface smoothness of the burst pattern area Asb of the magnetic disk 10. Similarly, it is possible to positively avoid a thick residue from being left within the preamble pattern area Asp to thereby maintain more excellent surface smoothness of the preamble pattern area Asp of the magnetic disk 10. Further, since the frequency of a signal component corresponding to the B concave/convex pattern in the present invention is higher than the frequency of a signal component corresponding to the A concave/convex pattern in the present invention, it is also possible to eliminate or attenuate the signal component corresponding to the B concave/convex pattern, using a general noise filter mounted on a recording/reproducing apparatus of this kind.

Further, the present hard disk drive 1 includes the magnetic disk 10, and the signal-extracting section 5 that extracts a signal component corresponding to the A concave/convex pattern while eliminating a signal component corresponding to the B concave/convex pattern, from a signal obtained by the magnetic head 3, and the control section 9 thereof performs servo control according to servo data based on the extracted signal component. As a result, according to the hard disk drive 1, it is possible to perform accurate tracking servo by reading out preamble data from the preamble pattern area Asp and burst data from the burst pattern area Asb, without being adversely affected by the convex portions 31sb, 31sp, and so forth, which are formed to obtain excellent surface smoothness of the preamble pattern area Asp and the burst pattern area Asb.

It should be noted that the present invention is not limited to the above-described configuration. For example, although in the above-described magnetic disk 10, the convex portions 31sb are formed at a pitch smaller than the pitch at which the convex portions 21sb are formed, in the burst pattern area Asb, in a magnetic disk 10a shown in FIG. 9, by way of example, it is also possible to form a B concave/convex pattern in the present invention by forming convex portions 41sb (example of the non-servo convex portions in the present invention) at a pitch larger than the pitch at which the convex portions 21sb are formed, at portions of the conventional magnetic disk 10x where the convex portions 21x for the burst pattern are formed, and form convex portions 21bx (another example of the servo convex portions in the present invention, which has the same function as that of the convex portions 21x of the conventional magnetic disk 10x: portions enclosed by broken lines in FIG. 9) by this B concave/convex pattern. More specifically, in the burst pattern area Asb of the magnetic disk 10a, a concave/convex pattern 20sba corresponding to the A concave/convex pattern in the present invention is formed by the concave/convex pattern comprised of the convex portions 21sb and the concave portions 22sb, and the convex portions 21bx formed with a B concave/convex pattern comprised of the convex portions 41sb and the concave portions 42sb.

Figure 9:
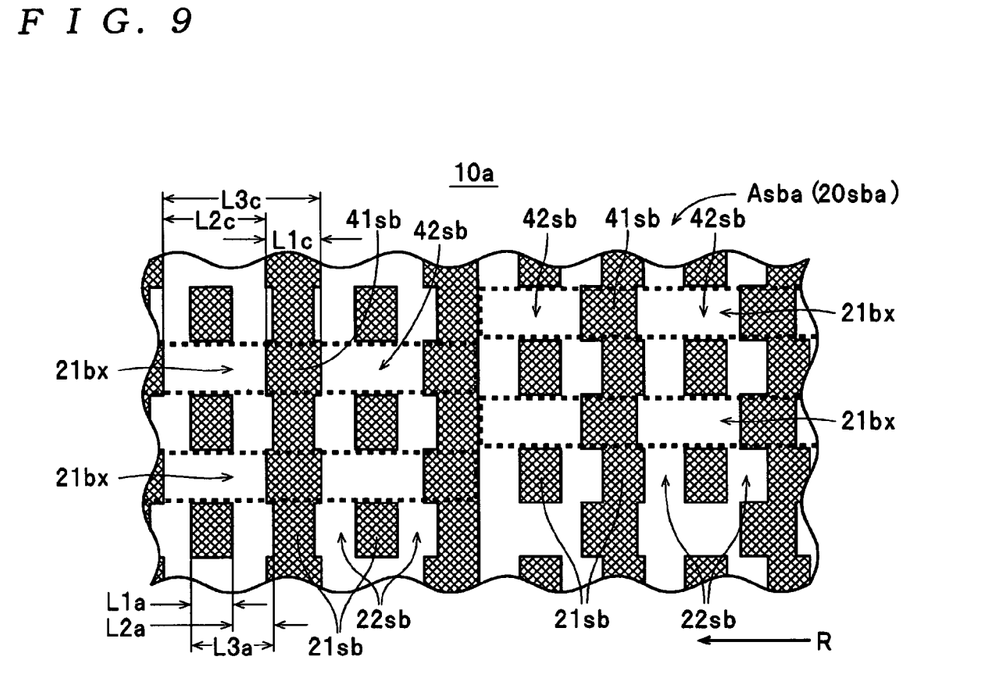
FIG. 9 is a plan view of a burst pattern area of another magnetic disk.

In the above case, the length L1c of each convex portion 41sb in the direction of rotation is set to be longer than the length L1a of the convex portion 21sb in the direction of rotation. Similarly, the length L2c of each concave portion 42sb in the direction of rotation is set to be longer than the length L2a of the concave portion 22sb in the direction of rotation, and at the same time sufficiently shorter than the length L1x of the convex portion 21x of the conventional magnetic disk 10x. Therefore, a length L3c, which is the total length of the length L1c of the convex portion 41sb and the length L2c of the concave portion 42sb (i.e. a pitch at which the convex portions 41sb are formed) becomes longer than the length L3a, which is the total length of the length L1a of the convex portion 21sb and the length L2a of the concave portion 22sb (i.e. the pitch at which the convex portions 21sb are formed) (example of "a state in which non-servo convex portions are formed at a pitch different from the pitch at which the servo convex portions are formed"). Accordingly, when burst data is read from the burst pattern area Asba, a signal component corresponding to the convex portions 41sb is eliminated, whereby similarly to the above-described magnetic disk 10, it is possible to perform tracking control according to burst data based on a signal component corresponding to the convex portions 21sb.

Figure 10:
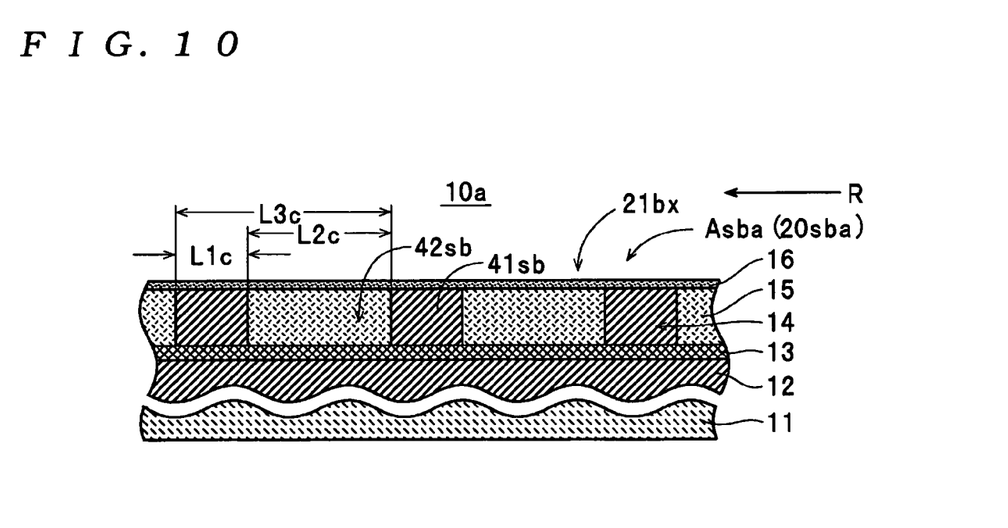
FIG. 10 is a cross-sectional view of portions of the FIG. 9 burst pattern area where convex portions and concave portions are formed.

According to the magnetic disk 10a and the hard disk drive 1, an A concave/convex pattern having a plurality of convex portions 21sb to form a burst pattern, and a B concave/convex pattern having convex portions 41sb formed at a pitch larger than the pitch at which are formed the convex portions 21sb are formed within the burst pattern area Asba. This makes it possible to form the convex portions 21bx by forming a plurality of convex portions 41sb having the length L1c sufficiently shorter than the length L1x of each convex portion 21x, in place of the convex portions 21x, at portions of the conventional magnetic disk 10x where the convex portions 21x are formed. Therefore, by etching the layer of the non-magnetic material 15 under an etching condition which can cause the upper surfaces of the convex portions 21sb to be exposed, similarly, the upper surfaces of the convex portions 41sb can also be caused to be exposed, as shown in FIG. 10. As a result, it is possible to being produced on portions of the conventional magnetic disk 10x where the convex portions 21x are formed, and hence it is possible to maintain excellent surface smoothness within the burst pattern area Asba. This makes it possible to maintain a proper flying height of the magnetic head 3 within the burst pattern area Asba, and consequently, according to the hard disk drive 1 having the magnetic disk 10a mounted thereon, it is possible to execute stable recording and reproducing of recording data.

Figure 11:
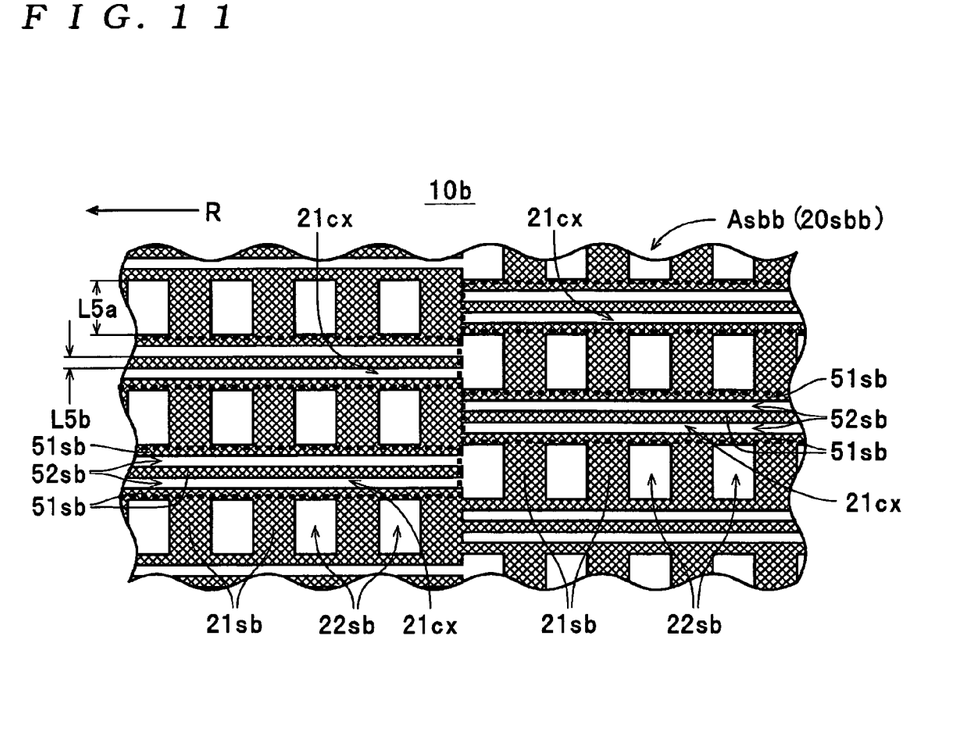
FIG. 11 is a plan view of a burst pattern area of still another magnetic disk.

Further, although in the aforementioned magnetic disk 10, the B concave/convex pattern is formed by arranging the convex portions 31sb and the concave portions 32sp side by side in the direction of rotation of the magnetic disk 10, this is not limitative, but for example, as in a magnetic disk 10b shown in FIG. 11, it is also possible to form a B concave/convex pattern in the present invention by arranging convex portions 51sb corresponding to the non-servo convex portions in the present invention, and concave portions 52sb formed between the convex portions 51sb and 51sb, in the radial direction of the magnetic disk 10b (vertical direction as viewed in FIG. 11), and form convex portions 21cx (still another example of the servo convex portions in the present invention, which has a similar function to that of the convex portions 21x of the conventional magnetic disk 10x: portions enclosed by broken lines in FIG. 11) by the B concave/convex pattern. In this case, the length L5b of each convex portion 51sb in the radial direction of the magnetic disk 10b is sufficiently shorter than the length L5a of the convex portion 21sb in the radial direction, or the length L5x (see FIG. 14) of the convex portion 21x of the conventional magnetic disk 10x in the radial direction of the magnetic disk 10x. Therefore, by etching the layer of the non-magnetic material 15 under an etching condition which can cause the upper surfaces of the convex portions 21sb to be exposed, similarly, the upper surfaces of the convex portions 51sb can also be caused to be exposed. According to the magnetic disk 10b and the hard disk drive 1, this makes it possible to avoid a thick residue from being produced on portions of the conventional magnetic disk 10x where the convex portions 21x are formed, and hence it is possible to maintain excellent surface smoothness within the burst pattern area Asbb of the magnetic disk 10b. This makes it possible to maintain a proper flying height of the magnetic head 3 within the burst pattern area Asbb, and consequently, according to the hard disk drive 1 having the magnetic disk 10b mounted thereon, it is possible to execute stable recording and reproducing of recording data.

Figure 12:
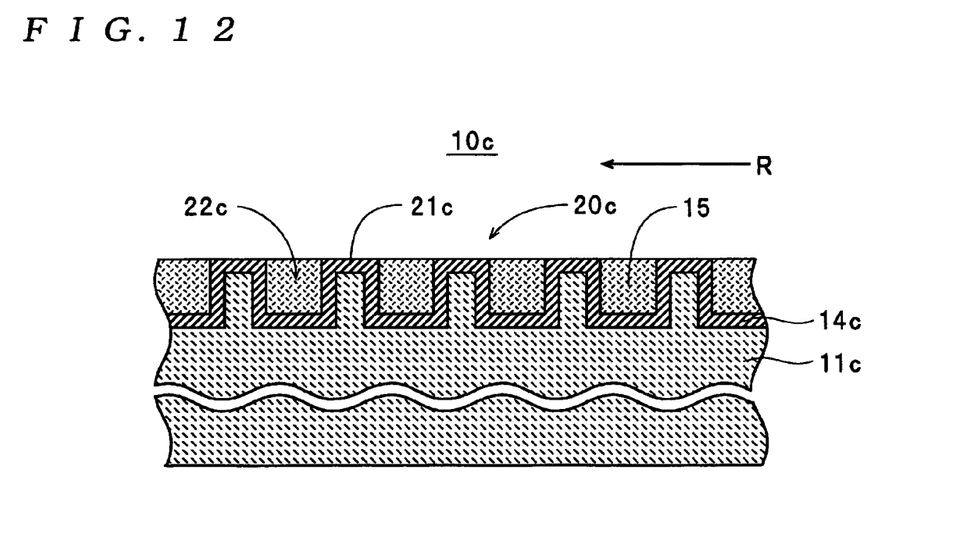
FIG. 12 is a cross-sectional view of the layer structure of still another magnetic disk.
Figure 13:
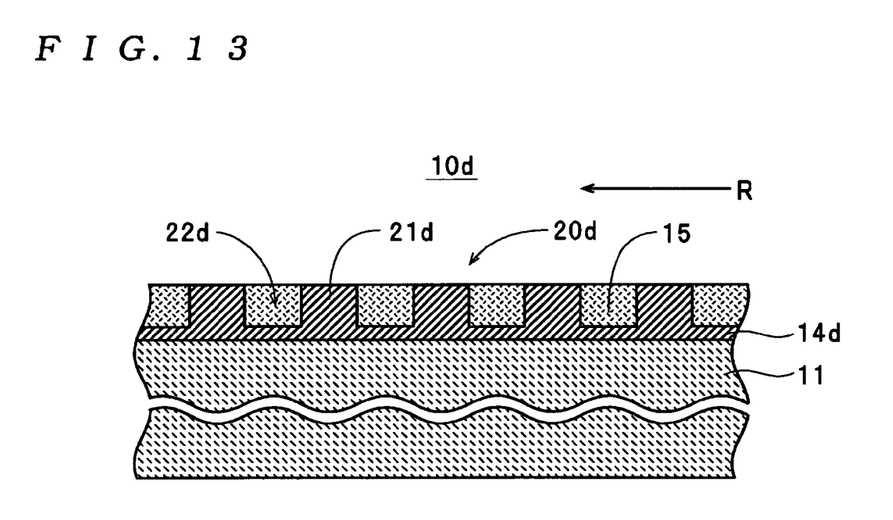
FIG. 13 is a cross-sectional view of the layer structure of still another magnetic disk.

Furthermore, the convex portions 21sa within the address pattern area Asa can also be formed by a concave/convex pattern (B concave/convex pattern in the present invention) having a plurality of non-servo convex portions. Further, the servo pattern in the present invention is not limited to the aforementioned example, but it is also possible to form a servo pattern by inverting the concave-convex shape of the concave/convex patterns 20s in the servo pattern area As of the magnetic disk 10, and setting the respective lengths of the convex portions such that the various conditions in the present invention are satisfied. Further, although in the above-described magnetic disk 10, the convex portions 21 of the concave/convex patterns 20s are made of a magnetic material, this is not limitative, but as in a magnetic disk 10c shown in FIG. 12, by forming a magnetic layer 14c in a manner covering a concave/convex pattern formed on a substrate 11c, it is also possible to form a concave/convex pattern 20c by convex portions 22c surfaces of which are formed by the magnetic layer 14c, and concave portions 22c bottom surfaces of which are formed by the magnetic layer 14c. Furthermore, as in a magnetic disk 10d shown in FIG. 13, it is also possible to form a concave/convex pattern 20d by continuously forming a magnetic layer 14d for forming convex portions 21d, and a magnetic layer 14d for forming the bottom surfaces of concave portions 22d between the convex portions 21d, with each other. In the above magnetic disks 10c and 10d as well, it is possible to enhance the surface smoothness within the servo pattern areas thereof sufficiently by forming servo convex portions with the B concave/convex pattern having a plurality of non-servo convex portions formed therein at a pitch different from the pitch at which the servo convex portions are formed.

Further, although the hard disk drive 1 described above is configured such that the signal-extracting section 5 formed by the DSP extracts a signal component corresponding to the A concave/convex pattern while eliminating or attenuating a signal component corresponding to the B concave/convex pattern, this is not limitative in the present invention, but the hard disk drive 1 can also be configured to employ various filters, such as a LPF, a HPF (High Pass Filter), and a BPF (Band Pass Filter), so as to extract a signal component corresponding to the A concave/convex pattern while eliminating or attenuating a signal component corresponding to the B concave/convex pattern.

What is claimed is:

1. An information recording medium wherein a data track pattern and a servo pattern are formed at least on one side of a substrate by concave/convex patterns including a plurality of convex portions, the concave/convex patterns having concave portions each having a non-magnetic material embedded therein, and wherein a burst pattern in the servo pattern is formed by alternately arranging a portion where the convex portions and the concave portions are alternately arranged in a direction of rotation of the substrate at a predetermined formation pitch associated with servo data, and a portion where the convex portions and the concave portions are alternately arranged in the direction of rotation at a formation pitch smaller than the predetermined formation pitch, in a radial direction of the substrate.

2. The information recording medium according to claim 1, wherein the convex portions formed at the formation pitch smaller than the predetermined formation pitch are formed such that at least one of a length along the direction of rotation and a length along the radial direction is equal to or smaller than a corresponding length of the convex portions formed at the predetermined formation pitch.

3. An information recording medium wherein a data track pattern and a servo pattern are formed at least on one side of a substrate by concave/convex patterns including a plurality of convex portions, the concave/convex patterns having concave portions each having a non-magnetic material embedded therein, and wherein a burst pattern in the servo pattern is formed by alternately arranging a portion where the convex portions and the concave portions are alternately arranged in a direction of rotation of the substrate at a predetermined formation pitch associated with servo data, and a portion where the convex portions and the concave portions are alternately arranged in the direction of rotation at a formation pitch larger than the predetermined formation pitch, in a radial direction of the substrate.

4. An information recording medium wherein a data track pattern and a servo pattern are formed at least on one side of a substrate by concave/convex patterns including a plurality of convex portions, the concave/convex patterns having concave portions each having a non-magnetic material embedded therein, and wherein a burst pattern in the servo pattern is formed by alternately arranging a portion where the convex portions and the concave portions are alternately arranged in a direction of rotation of the substrate at a predetermined formation pitch associated with servo data, and a portion where the convex portions and the concave portions are alternately arranged in a radial direction of the substrate, in the radial direction.

5. A recording/reproducing apparatus comprising:

an information recording medium wherein a data track pattern and a servo pattern are formed at least on one side of a substrate by concave/convex patterns including a plurality of convex portions, the concave/convex patterns having concave portions each having a non-magnetic material embedded therein, and wherein a burst pattern in the servo pattern is formed by alternately arranging a portion where the convex portions and the concave portions are alternately arranged in a direction of rotation of the substrate at a predetermined formation pitch associated with servo data, and a portion where the convex portions and the concave portions are alternately arranged in the direction of rotation at a formation pitch smaller than the predetermined formation pitch, in a radial direction of the substrate.

6. A recording/reproducing apparatus comprising:

an information recording medium wherein a data track pattern and a servo pattern are formed at least on one side of a substrate by concave/convex patterns including a plurality of convex portions, the concave/convex patterns having concave portions each having a non-magnetic material embedded therein, and wherein a burst pattern in the servo pattern is formed by alternately arranging a portion where the convex portions and the concave portions are alternately arranged in a direction of rotation of the substrate at a predetermined formation pitch associated with servo data, and a portion where the convex portions and the concave portions are alternately arranged in the direction of rotation at a formation pitch smaller than the predetermined formation pitch, in a radial direction of the substrate;

a magnetic head that obtains a signal recorded on the information recording medium;

a signal-extracting section that extracts a signal component corresponding to the portion where the convex portions and the concave portions are formed at the predetermined formation pitch while eliminating or attenuating a signal component corresponding to the portion where the convex portions and the concave portions are formed at the formation pitch smaller than the predetermined formation pitch; and a control section for performing servo control according to servo data based on the signal component extracted by the signal-extracting section.

7. A recording/reproducing apparatus according to claim 5, wherein the convex portions formed at the formation pitch smaller than the predetermined formation pitch are formed such that at least one of a length along the direction of rotation and a length along the radial direction is equal to or smaller than a corresponding length of the convex portions formed at the predetermined formation pitch.

8. A recording/reproducing apparatus comprising:

an information recording medium wherein a data track pattern and a servo pattern are formed at least on one side of a substrate by concave/convex patterns including a plurality of convex portions, the concave/convex patterns having concave portions each having a non-magnetic material embedded therein, and wherein a burst pattern in the servo pattern is formed by alternately arranging a portion where the convex portions and the concave portions are alternately arranged in a direction of rotation of the substrate at a predetermined formation pitch associated with servo data, and a portion where the convex portions and the concave portions are alternately arranged in the direction of rotation at a formation pitch larger than the predetermined formation pitch, in a radial direction of the substrate.

9. A recording/reproducing apparatus comprising:

an information recording medium wherein a data track pattern and a servo pattern are formed at least on one side of a substrate by concave/convex patterns including a plurality of convex portions, the concave/convex patterns having concave portions each having a non-magnetic material embedded therein, and wherein a burst pattern in the servo pattern is formed by alternately arranging a portion where the convex portions and the concave portions are alternately arranged in a direction of rotation of the substrate at a predetermined formation pitch associated with servo data, and a portion where the convex portions and the concave portions are alternately arranged in the direction of rotation at a formation pitch larger than the predetermined formation pitch, in a radial direction of the substrate;

a magnetic head that obtains a signal recorded on the information recording medium;

a signal-extracting section that extracts a signal component corresponding to the portion where the convex portions and the concave portions are formed at the predetermined formation pitch while eliminating or attenuating a signal component corresponding to the portion where the convex portions and the concave portions are formed at the formation pitch larger than the predetermined formation pitch; and a control section for performing servo control according to servo data based on the signal component extracted by the signal-extracting section.

10. A recording/reproducing apparatus comprising:

an information recording medium wherein a data track pattern and a servo pattern are formed at least on one side of a substrate by concave/convex patterns including a plurality of convex portions, the concave/convex patterns having concave portions each having a non-magnetic material embedded therein, and wherein a burst pattern in the servo pattern is formed by alternately arranging a portion where the convex portions and the concave portions are alternately arranged in a direction of rotation of the substrate at a predetermined formation pitch associated with servo data, and a portion where the convex portions and the concave portions are alternately arranged in a radial direction of the substrate, in the radial direction.

* * * * *